Oct. 14, 1952
H. C. SCHAEFER
2,613,593
EXPANSION CONTROL FOR HAY BALERS
Filed June 14, 1951
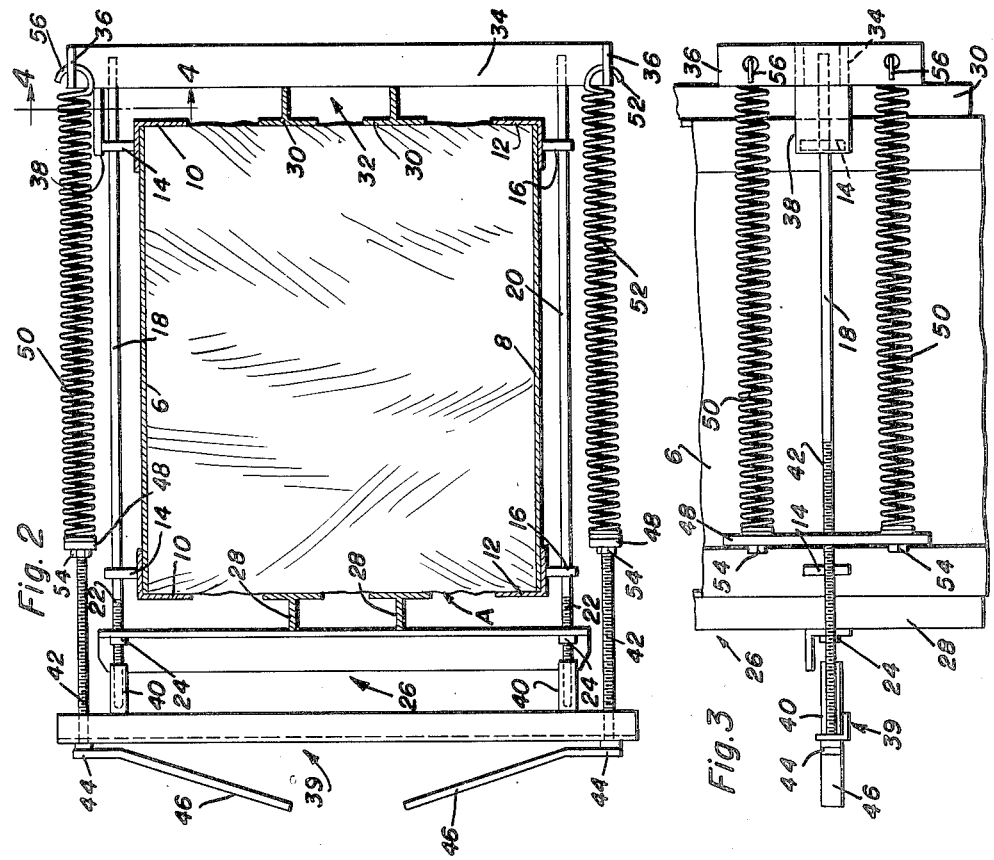
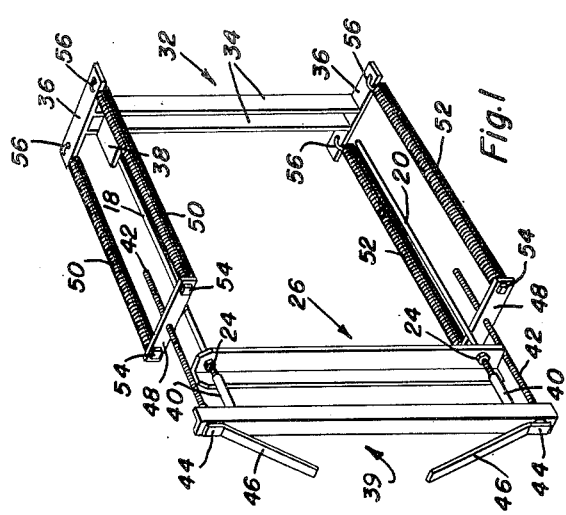
Hilbert C. Schaefer
INVENTOR.

UNITED STATES PATENT OFFICE 2,613,593

EXPANSION CONTROL FOR HAY BALERS

Hilbert C. Schaefer, South Amana, Iowa

Application June 14, 1951, Serial No. 231,454

4 Claims. (Cl. 100—192)

This invention relates to certain new and useful improvements in a novel self-adapting expansion control attachment for hay balers of the types which use twine to tie the bales, for example, a baler such as that shown in Patent No. 2,396,720, said attachment functioning to turn out bales of uniform size and density which are rarely, if ever, broken.

In the baler shown in Patent No. 2,396,720, the pack of material is baled between horizontal top and bottom press plates which are relatively fixed and the usual side bulging and distending is maintained fairly well under control by the use of a so-called manually regulated expansion control means. The latter embodies a pair of opposed uprights or verticals, generally in the form of angle irons, these pressing forcibly against horizontal tension rails in the form of T-beams which are disposed in parallelism and press against adjacent vertical surfaces of the bale in the making, to prevent over-expansion of the same. The uprights, one slidable and the other one relatively fixed, are bolted together and are moved toward and from each other by adjusting the usual nuts on the assembling bolts. To accomplish such results it is necessary, while the baler is in the field, for an attendant to ride alongside of same and make frequent hand regulated adjustments. This is due to the fact that the coarseness and fibrous character of materials baled vary from time to time. It is desirable, of course, to turn out a twine tied bale which is substantially uniform in accordance with predetermined measurements. That is to say, it is desirable to have the respective bales substantially uniform one to the other and the difficulties and painstaking effort attending the manual adjusting and regulating results are obviously apparent.

The present invention contemplates the provision of means, in the form of an attachment, which is substantially automatic and which constitutes a tensioning device and which is therefore substantially self-acting in controlling the side bulging and expansion of the bale in the stated press. Generally speaking, novelty is predicated on a pair of spaced parallel uprights which bear against the stated T-shaped tension rails, one upright (at the left in the drawings) being adjustable, but relatively fixed, and the other upright being adjustable toward and from said one upright. The first named upright is supported on rods which are already provided on the baler shown in Patent No. 2,396,720. These same rods support a vertical adapter or thrust plate which is parallel with said fixed upright. Coil springs are attached at corresponding ends to the upper and lower end portions of the adjustable upright and said coil springs having their opposite ends adjustably fastened to the respective upper and lower ends of said adapter plate.

More specifically, in reducing to practice the preferred embodiment of the invention I have evolved and produced a simple, economical and practical expansion control for hay balers which is in the form of a readily applicable and removable attachment in which manufacturers and users will find their expected requirements and needs fully met, contained and readily available. To this end, the automatic expansion control takes care of the variations and conditions met in the particular area of the field in which the hay or straw is lying. It automatically takes care of sufficient hay being picked up to form a well packed uniform bale.

Novelty is also predicated upon a construction which lends itself to satisfactory handling of wet and damp hay and straw in that when the latter is being baled in large amounts and is being plunged into the press at one and the same time, the adaptable springs of the expansion control automatically release the tension of the baler press sufficiently to permit the twine to slip between the bale and thus to avoid breakage of the twine.

Then, too, and because the attachment makes for uniform bales, it will appreciably lessen excessive strain on the motor of the baler and will conserve the life and longevity of the motor and baler with a resultant saving on fuel.

What is more, novelty is predicated upon an efficient attachment which is susceptible of being readily installed and which is adaptable to any twine binding baler utilizing horizontal top and bottom plates and complemental tension rails which are shiftable toward and from each other in the space between said plates.

As will be hereinafter evident, the over-all novelty has to do, on the one hand, with the attachment in embracing and harnessing position on the baling chamber of a baler and, in addition, has to do with the attachment, as such.

Further objects and advantages will become more readily apparent from the following description and the accompanying sheet of illustrative drawings.

In the accompanying sheet of drawings, wherein like numerals are employed to designate like parts throughout the views:

Figure 1 is a perspective view of the expansion control attachment per se constructed in accordance with the principles of the present invention.

Figure 2 is a view showing the attachment in use on a conventional-type baler such as that shown in Patent No. 2,396,720, parts of the baler appearing primarily in section.

Figure 3 is a fragmentary top plan view of the structure depicted in Figure 2.

Figure 4 is a fragmentary detail section taken on the plane of the vertical line 4—4 of Figure 2, looking in the direction of the arrows.

With reference to Figure 2 the baler comprises top and bottom relatively fixed flat plates 6 and 8 respectively, provided along outer marginal edges with permanently attached angle irons or cornice members 10, 10 and 12, 12 respectively. These angle irons are provided with lateral outstanding apertured ears 14, 14 and 16, 16 respectively which accommodate and support transverse rods 18 and 20 respectively. The ends of the rods project beyond respective angle irons 10, 10 and 12, 12. The left hand ends of said rods, as best shown in Figure 2, are screw-threaded as at 22—22. Said threads accommodating adjusting and retaining nuts 24—24. The nuts serve to hold in position upright means 26, here shown in the form of an angle iron. The apertured ends of the angle iron are fitted over the screw-threaded ends 22—22 and said angle iron is forced inwardly by adjusting the nuts 24 and in so doing is pressed against spaced parallel T-shaped tension rails 28—28. These rails are not attached to upright means 26 and in practice they are suitably supported (not shown) on the forward end of the baler press or machine. There are similar T-shaped tension rails 30—30 on the right hand side of the baler chamber or press and these are abutted and held in place by a complemental relatively movable unit 32 constituting upright means. This unit or means 32 is actually a principal component or part of the attachment shown in Figure 1 but may be best described as one of the components of the over-all combination depicted in Figure 2. Continuing with this idea in mind, the said upright means 32 comprises a pair of spaced parallel bars 34—34 (see Fig. 4) and the bars are provided at their respective upper and lower ends with integral heads or spring anchoring members 36—36. The upper ends of the said bars are provided with an outstanding hanger and supporting lug 38 which in practice rests on the adjacent ear 14 as best shown in Figure 2. The adjacent ends of the rods 18 and 20 extend in the space between the bars 34—34 as shown in dotted lines in Figure 2. It follows therefore that 26 is a relatively fixed but adjustable upright pressing against the tension rails 28 and 32 is the complemental relatively movable or expansible and contractible upright which bears against the remaining rails 30—30.

Attention is now directed to an end thrust member which may perhaps be best identified as a vertical adapter and this is denoted by the numeral 39 and takes the form, specifically, of an angle iron. One flange thereof is provided with outstanding fixedly mounted socket members 40—40 and these are fitted telescopically but removably over the adjacent threaded ends (the right hand ends in Figure 2) of the aforementioned rods 18 and 20. Thus, the rods support the upright means 26 and also the complemental adapter 39. The same adapter has apertures adjacent its upper and lower ends to accommodate insertable and removable spring adjusting and tensioning bolts 42—42. The left hand ends of the bolts extend through and beyond the adapter where they are provided with adjusting heads 44—44 provided with suitable and conveniently arranged crank handles 46—46. The right hand ends of these bolts are adjusted through screw-threaded holes provided therefor in spring tension take-up members which are best shown in Figure 1 and which are conveniently identified as crossheads 48—48. Upper and lower pairs of coil springs 50—50 and 52—52 are suitably anchored as at 54 to the respective crossheads. The opposite ends of the springs are free and provided with hooks 56—56 which are releasably engaged in openings provided therefor in the aforementioned anchoring heads 36.

It is obvious that the upright means 26 is mounted on the threaded portions 22—22 of the rods 18 and 20 and the nuts 24 are adjusted to force said rod against the coacting tension rails 28 thus bringing these rails into alignment one above each other as shown and also in alignment with the upper and lower angle irons 10 and 12. These angle irons along with the tension rails and parts just mentioned provide a relatively fixed guide in the baling chamber for one vertical side of the bale A. The socket members 40 are slipped over the extending threaded ends of the rods 18 and 20 and the coil springs are stretched across the baling chamber above and below the upper and lower press plates 6 and 8. The upright means 32 is engaged with the tension rails 30—30 and the springs are attached thereto in the manner shown. Now, the expansible and contractible attachment completely harnesses the rails 28—28 and 30—30 to the baling chamber. It will be noticed in this connection that the hanger and supporting lug 38 resting on the ear 14 assists in positioning and properly retaining the upright means 32 in an effective position. It follows that whenever it is necessary the hand cranks 46—46 are turned in proper directions and the bolts 42—42 are adjusted to act on the crossheads 48—48 whereby to tension the coil springs 50—50 and 52—52. This puts the upright means 32 yieldably under pressure whereby the two uprights 26 and 32 now coact with the tension rails 28—28 and 30—30 to exert pressure against the vertical sides of the bale A and to compress it, to size it and to turn it out in desired uniform fashion.

It is manifest that the significant purpose of the automatic means is to provide an even tension and to make uniform bales. There will be no loose or tight bales once the device herein shown is used. In very tough hay the automatic tension means will permit the tying strings or twine to slide through and not break as in the case where the aforementioned manual control is used. The device in use will permit more evenly packed bales to be turned out and its use does away with one man who ordinarily has to ride alongside of the press and adjust the manual control means depending on the weight of the hay which is being baled. It may be added that the tension of the springs once adjusted to the type of hay or straw being baled need not be again changed. The coil springs will automatically create correct tension for tight bales and the kind of hay or straw being baled.

This application is a continuation-in-part of application Serial No. 50,785 of September 23, 1948, abandoned on February 6, 1951.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. In a hay baler of the class described, in combination, upper and lower relatively fixed horizontal plates situated in spaced parallelism in respect to each other, a horizontal rod fixed transversely across said upper plate, a second horizontal rod fixed transversely across said lower plate, the end portions of said rods projecting beyond the respective edge portions of said plates, opposed tension rails disposed in positions in a plane between said upper and lower plates, upright means adjustably mounted on corresponding end portions of said rods and bearing against adjacent tension rails, additional upright means associated with the opposite end portions of said rods and bearing against the remaining tension rails, a vertical thrust plate having socket members telescopically and removably fitted over adjacent end portions of said rods, coil springs assembled in upper and lower pairs and anchored at corresponding ends on upper and lower end portions of said second named upright means, crossheads secured to the opposite corresponding ends of said upper and lower pairs of coil springs, said crossheads having screw-threaded bolt holes, and handle equipped bolts carried by the respective upper and lower end portions of said thrust plate, said bolts being screwed through said bolt holes.

2. In a hay baler of the class described, in combination, a baling chamber embodying upper and lower relatively fixed horizontal press plates disposed in spaced parallelism one above the other, a horizontal rod extending transversely across said upper plate and attached to said plate, one end portion of said rod being screw-threaded, a second horizontal rod extending transversely across the lower plate and attached thereto and one end thereof being screw-threaded, the screw-threaded ends of said rods projecting beyond the corresponding marginal edge portions of said upper and lower plates, an upright slidably mounted at its opposite end portions on the screw threaded ends of the respective rods, adjusting nuts on said screw-threaded portions bearing against the outer faces of said upright, tension rail means interposed between the intermediate portion of the upright and a corresponding portion of said baling chamber, complemental tension rail means opposed to said first named rail means and cooperable with the opposite side of said bailing chamber, a second upright having its intermediate portion bearing against the second named tension rail means, upper and lower pairs of coil springs disposed above and below the respective upper and lower plates and upper and lower rods, means anchoring corresponding ends of said coil springs to upper and lower ends of said second named upright, crossheads connecting the remaining ends of the coil springs in assembled relationship, a vertically disposed adapter plate disposed in spaced parallelism outwardly of said first named upright, means removably mounting said adapter on the adjacent screw-threaded end portions of said rods, tension adjusting bolts mounted in the respective upper and lower end portions of said adapter plate, and adjusting means for said bolts coacting with said adapter plate, said bolts being adjustably connected to the respective crossheads in a manner to permit said coil springs to be either tightened or loosened as the case may be.

3. A ready-to-install expansion control attachment for a hay baler comprising rigid upright means having coil spring attaching and anchoring members at its respective upper and lower ends, upper and lower pairs of spaced parallel coil springs having corresponding ends secured to said members, crossheads attached to and adjoining the opposite remaining ends of said upper and lower coil springs, said crossheads having bolts adjustably connected to their respective intermediate portions, and an end thrust adapter disposed in vertical spaced parallelism in respect to said upright means, said adapter being provided on one side with laterally projecting socket members, said socket members being adapted to be telescopically and removably mounted on supporting rods provided therefor, the upper and lower ends of said adapter having bolt holes and adjacent ends of said bolts extending through and beyond said holes and being provided with handles and said handles having end thrust contact with said adapter.

4. The structure specified in claim 3 together with upper and lower rod members adapted to be mounted on a relatively fixed baling chamber, corresponding ends of said rod members being screw-threaded and fitting telescopically into said socket members, and an upright having apertured upper and lower end portions slidably mounted on the respective bolt members, and adjusting nuts on said screw-threaded end portions bearing against said upright.

HILBERT C. SCHAEFER.

REFERENCES CITED

The following references are of record in the file of this patent:

UNITED STATES PATENTS

| Number | Name | Date |
| --- | --- | --- |
| 736,653 | Trabue | Aug. 18, 1903 |
| 2,396,720 | Nolt | Mar. 19, 1946 |
| 2,458,994 | Hill | Jan. 11, 1949 |